No. 768,437. PATENTED AUG. 23, 1904.
J. W. FAESSLER.
BOILER FLUE CUTTER.
APPLICATION FILED JAN. 13, 1904.
NO MODEL.
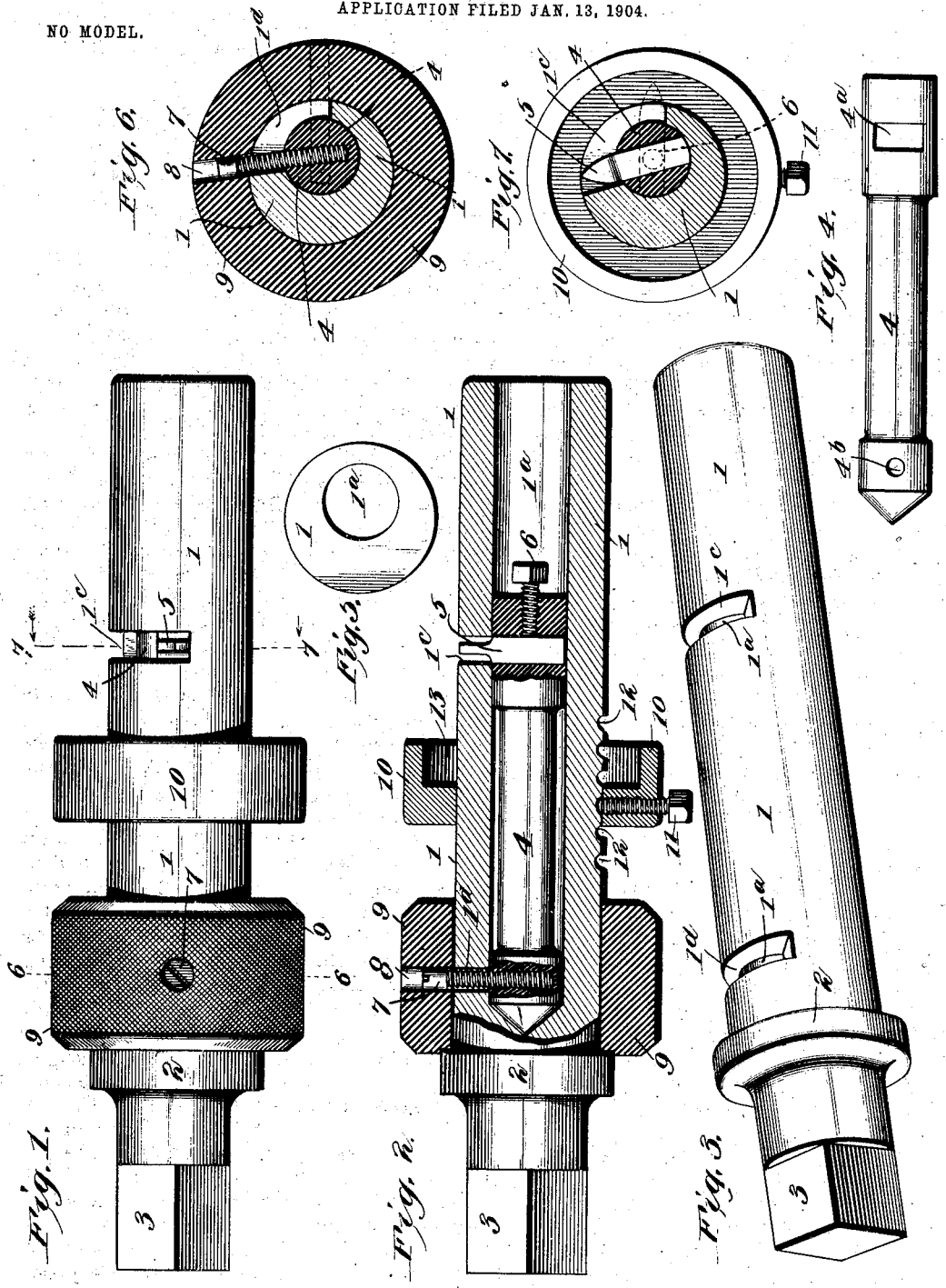
WITNESSES:
INVENTOR
John W. Faessler
BY
ATTORNEYS No. 768,437. Patented August 23, 1904.

UNITED STATES PATENT OFFICE.

JOHN WILLIAM FAESSLER, OF MOBERLY, MISSOURI.

BOILER-FLUE CUTTER.

SPECIFICATION forming part of Letters Patent No. 768,437, dated August 23, 1904.

Application filed January 13, 1904. Serial No. 188,881. (No model.)

*To all whom it may concern:*

Be it known that I, JOHN WILLIAM FAESSLER, a citizen of the United States, and a resident of Moberly, in the county of Randolph and State of Missouri, have made certain new and useful Improvements in Boiler-Flue Cutters, of which the following is a specification.

My invention is an improvement in that class of devices which are employed for cutting the flues or tubes of tubular boilers at a point within the flue-sheet. It is more particularly an improvement in that class of such cutters in which the body of the tool is provided with a cutter so attached that it may be projected from or retracted within a radial slot in the tool as required for work or when the tool is being inserted or withdrawn from the tube.

My object is to provide a tool which shall be simple and durable in construction, is efficient in use, and may be manufactured at comparatively small cost.

The details of construction, arrangement, and operation of parts are as hereinafter described, reference being had to the accompanying drawings, in which—

Figure 1 is a plan or side view of the complete flue-cutter. Fig. 2 is a central longitudinal section of the main portion of the same. Fig. 3 is a perspective view of the body of the tool. Fig. 4 is a plan or side view of the cutter-holder. Fig. 5 is an end view of the body of the tool. Fig. 6 is a cross-section on the line 6 6 of Fig. 1. Fig. 7 is a cross-section on the line 7 7 of Fig. 1.

1 indicates the cylindrical body of the tool, which is provided with an eccentric bore $1^a$ and a collar 2, also a squared shank 3. Within the eccentric bore $1^a$ is arranged a device which serves as a tool or cutter holder. The same is shown detached in Fig. 4 and is provided with a slot $4^a$ adjacent to its forward end and with a screw-threaded hole $4^b$ adjacent to its inner end. The latter is preferably conical, and the inner end of the eccentric bore $1^a$ is similarly formed. The enlarged end portions of the tool-holder 4 are cylindrical and adapted to fit easily within the eccentric bore $1^a$. The cutter 5 has a rectangular shank adapted to fit easily in the slot $4^a$ of the holder 4, and its outer end is suitably beveled to form a cutting edge. The cutter is secured by means of a screw 6, (see Fig. 2,) the same passing through the end portion of the holder 4 and clamping the cutter in any required radial adjustment. The cutting portion or beveled end of the tool 5 projects through a radial slot $1^c$, formed in the body 1 of the tool. As indicated in Figs. 6 and 7, this slot is slightly greater than a right angle in order to allow the cutter 5 due sweep therein, as required for projecting or retracting the same, as will be further explained. The tool-holder 4 is detachably secured in the tool-body 1 by means of a screw 7, which enters the hole $4^b$ of the holder and passes through a slot $1^d$ in the body of the tool, its head projecting into a radial opening 8 in a milled collar 9, which is applied to the body of the tool adjacent to its collar 2 and adapted to rotate freely thereon.

It will now be apparent that in using the flue-cutter the collar 9 is first rotated to the right for the purpose of moving the cutter 5 into the position shown by full lines, Fig. 7— that is to say, into such position that the point of the cutter lies wholly within the slot $1^c$ of the tool-body 1. The body 1 may then be inserted in a flue, and then the collar 9 is rotated to the left for the purpose of projecting the cutter 5 from the slot $1^c$, as indicated by dotted lines, Fig. 4. Power then being applied to the tool by means of some suitable motor the tool will be rotated and the flue cut as desired. When this has been effected, the collar 9 is rotated to the right and the cutter 5 thereby again placed in the position indicated by full lines, Fig. 4, whereupon the tool may be readily withdrawn from the flue or tube. It will be understood that in such movement of the collar 9 the head of the screw 7 slides in the hole 8 in the collar by reason of the eccentricity of the body of the tool, the thicker portion of the latter being interposed between the collar and the tool-holder 4 at the point where the opening 8 is formed, or the thinner portion thereof, according to the rotary movement of the parts 1 and 4 on each other.

It often happens that tubes require to be cut at different lengths from the flue-sheet, and to provide for this I employ a movable collar 10. The same is adapted to slide and rotate upon the tool-body 1 and may be clamped in any required adjustment by means of a screw 11, whose point is adapted to enter conical recesses 12, formed in the body 1. The collar 10 is provided with a circumferential flange which leaves a groove 13 between it and the body of the tool. This groove is adapted to receive the end of a tube or flue when the flue-cutter is in use.

In further explanation of the construction, use, and advantages of my flue-cutter I will state as follows: As has been stated, the rotatable collar 9 serves as a means for adjusting the tool-holder 4 for placing the cutter 5 in the projected or retracted position indicated by Fig. 7. In other words, the collar 9 is an efficient and easily-operated means by which the operator may control the position of the cutter. It is of use only in inserting the tool in or retracting it from a flue, and it is also used when a non-reversible air-motor is employed—that is, motors which run or rotate in only one direction; but when a reversible motor is used this collar 9 may be dispensed with, since by running the motor to the right the tool performs the cutting operation and by reversing the motor or running it in the opposite direction the cutter will be drawn back or retracted, so that the body of the tool may be easily removed from the flue. The squared shank 3, provided at the extreme end or butt of the complete tool, adapts the latter for connection with a motor or motor-shaft, the same being received into a suitable socket or coupling. It also adapts the tool for the application of a common wrench.

It will be observed that the body 1 of the tool is chambered or bored from one end only, or, in other words, that the bore extends only part way through the said body and that the tool-holder is arranged within the same, so that the power for rotating the tool must be applied to the square shank of the body. This arrangement has been found in practice to be more advantageous than a tool of the class in which the tool-holder extends completely through the cylindrical body and is adapted for the application of the power.

It is apparent that the cutter 5 may be adjusted or detached by loosening the screw 6, and for this purpose a suitable wrench may be inserted in the outer end of the eccentric bore 1ª.

Having thus described my invention, what I claim as new, and desire to secure by Letters Patent, is—

1. The improved flue-cutter, comprising a cylindrical body having an eccentric longitudinal bore extending a portion of its length, and also a radial slot, and a squared end or shank to which the rotating device may be applied, a cylindrical cutter-holder, arranged and adapted to rotate within said bore, the cutter secured in the holder and adapted to project from the slot in the body when the holder is suitably rotated upon the body, and the collar 9 connected with said cutter-holder for use in rotating it, as described.

2. The improved flue-cutter comprising a cylindrical body having an eccentric bore and two radial slots, a tool-holder adapted to fit and rotate within the said bore, a cutter proper held in said holder and working in one of the aforesaid slots, a collar applied to the tool-body exteriorly and adapted to rotate thereon, and provided with a radial opening, and a device which connects said collar with the tool-holder and is adapted for adjustment circumferentially in the rear slot of the tool-body, substantially as described.

3. The improved flue-cutter comprising a cylindrical body having a fixed collar and a squared shank, also an eccentric bore and two radial slots, a tool-holder adapted to fit and rotate within the eccentric bore, a cutter held in the holder and adapted to work in one of the slots, a collar applied to the body of the tool adjacent to the fixed collar, and having a radial opening which is coincident with the slot adjacent to the fixed collar, and a screw inserted through such opening and slot and entering the tool-holder, whereby it is adapted to serve as a means for adjusting the cutter in the projected or retracted position and is accessible on the outer side of the collar, in the manner described.

JOHN WILLIAM FAESSLER.

Witnesses:
JOHN PATTERSON,
J. A. WHITEFORD.